Patented June 24, 1930

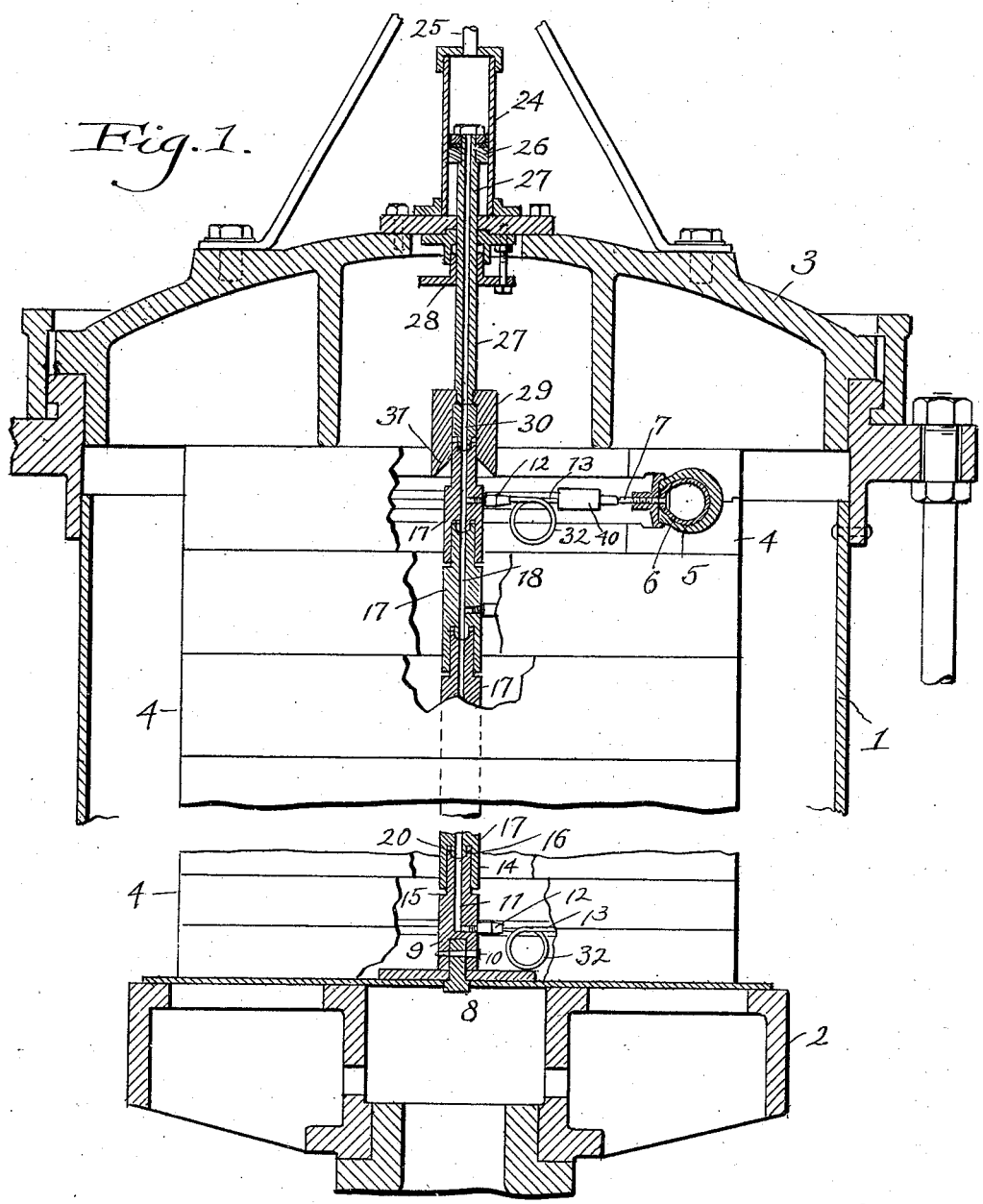

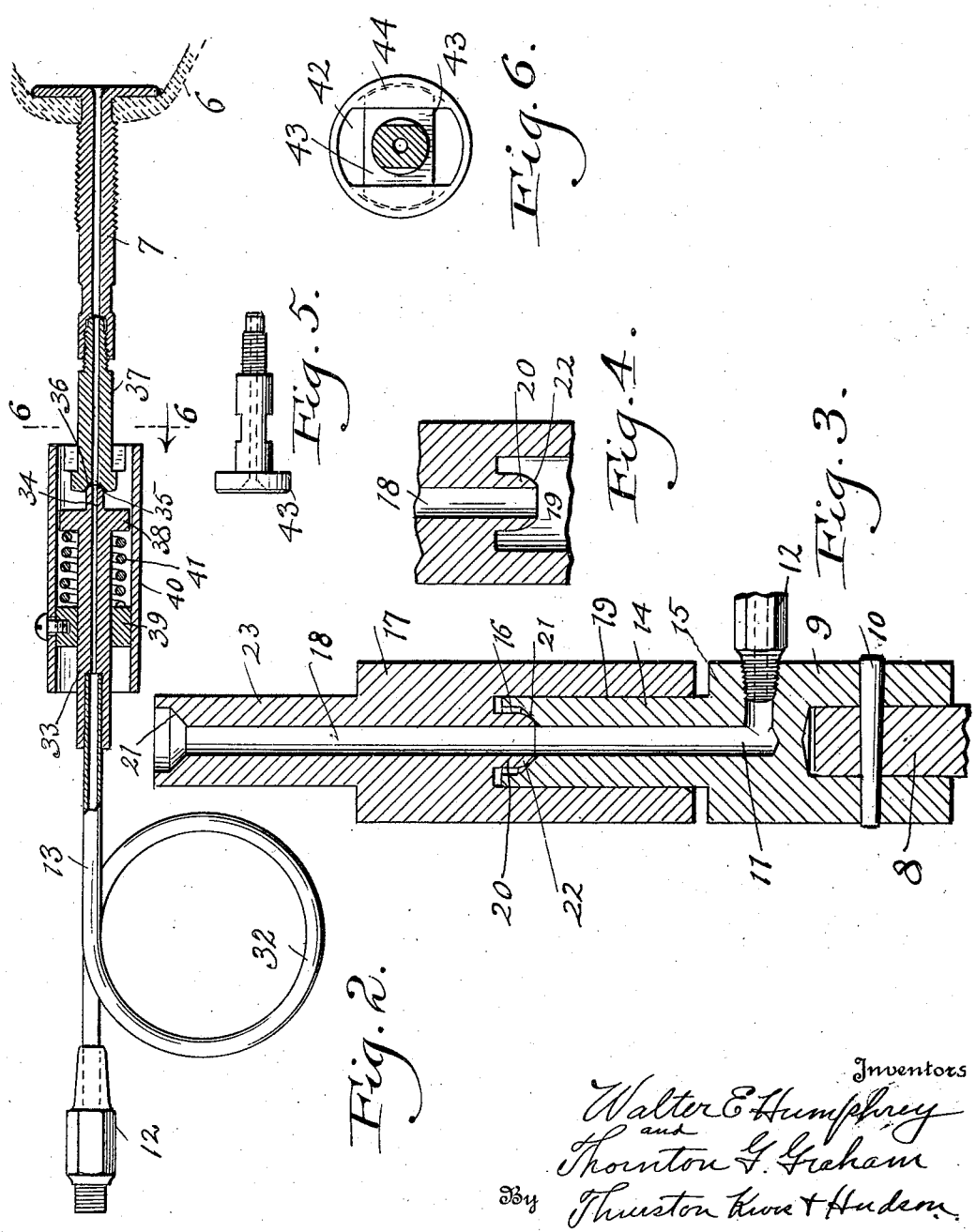

1,768,406

UNITED STATES PATENT OFFICE

WALTER E. HUMPHREY AND THORNTON G. GRAHAM, OF KENT, OHIO, ASSIGNORS, BY MESNE ASSIGNMENTS, TO THE MASON TIRE & RUBBER CO., OF KENT, OHIO, A CORPORATION OF DELAWARE

FLUID-CONDUCTING TREE FOR VULCANIZERS

Application filed December 7, 1923, Serial No. 679,126. Renewed February 10, 1930.

This invention relates to fluid conducting trees for vulcanizers and is designed particularly for use in connection with the process of vulcanizing automobile tires in which the annular tire moulds are piled upon a vertically movable plunger forming the bottom of the vulcanizing press and pressure is maintained within the tire casings by means of air bags.

In this process a so called air tree has been employed, the tree being built up within the pile of annular moulds and consisting of sections screwed together or joined by screw couplings to provide air tight connections. These sections have been joined by branch pipes with the stems of the air bags by similar connections and means have been provided for introducing air under the desired pressure through the cover to the tree to maintain the desired pressure in the air bags during the vulcanizing operation.

In modern tire vulcanizing plants the vulcanizing presses are arranged in groups and the moulds are delivered to and from the presses by an endless conveyor system which travels past the vulcanizing presses and the mould filling and discharging stations, the presses being discharged and filled successively so as to make the operation continuous insofar as possible. It will be quite apparent that the time required for discharging and filling a press is an important factor in the cost of the vulcanizing operation. If considerable time is required for discharging and filling a press, more vulcanizing presses will be required to do the same amount of work and more men will be required for the work. In other words a slow discharging and filling of the presses tends to slow down the whole system. In vulcanizing by the process above referred to the assembly and disassembly of the air tree has heretofore been a slow and laborious operation requiring the individual presses to be inoperative for a considerable period of time between vulcanizing operations and materially slowing up all of the operations.

It is the object of the present invention to provide a tree that can be built up as fast as the moulds are placed in the vulcanizer and which can be disassembled with equal rapidity.

A further object is to provide a telescopic slip joint connections between the sections of the tree which are fluid tight and in addition to provide joints which do not require packing elements to make them fluid tight.

A further object is to provide means for maintaining the joints under compression during the operation of the vulcanizer to maintain the fluid tight connections at the joint.

A further object is to provide a tree provided with branch tubes which are adapted to be connected to moulds of different diameters.

A further object is to provide means for maintaining the joints between the air bag stem and branch tubes under compression to prevent leakage.

With these and other objects in view the invention may be said to comprise the structure illustrated in the accompanying drawings described in the following specification and specifically set forth in the appended claims, together with such modifications and variations thereof as will be obvious to those skilled in the art to which the invention appertains.

Reference should be had to the accompanying drawings forming a part of this specification in which Fig. 1 is a vertical axial section through a vulcanizing press showing a pile of moulds within the press and the air tree assembled within the pile; Fig. 2 is a view showing a branch tube and the connection between the branch tube and the stem of an air bag, the air bag stem, the coupling members and a portion of the branch tube being shown in section, the remainder of the tube being shown in said elevation; Fig. 3 is an enlarged vertical section through the two sections of the tree adjacent the bottom of the vulcanizing press; Fig. 4 is a fragmentary vertical section through the lower end of one of the tree sections; Fig. 5 is a side elevation of the coupling attachment for the end of the air bag stem; Fig. 6 is a vertical transverse section taken on line 6—6 of Fig. 2.

Referring to the accompanying drawings, an ordinary vulcanizing press is shown in Fig. 1 consisting of a cylindrical casing 1 having a bottom 2 in the form of a vertically movable plunger and a cover 3 detachably fastened to the top of the casing. When the vulcanizing press is in use a series of annular tire moulds 4 are piled upon the movable bottom member 2, each of the tire moulds containing a tire casing 5. Within each tire casing is an air bag 6 substantially in the form of an inner tube and each air bag has a stem 7 which projects through the inner wall of the annular mould.

At the center of the plunger 2 there is rigidly attached a pin 8 which projects above the upper face of the plunger. The lowermost section 9 of the air tree has a bore at its lower end of a diameter to fit over the upper end of the pin 8 and the section 9 is fastened to the pin 8 by means of a transverse pin 10 journaled through transverse openings in the lower end of the section 9 and pin 8. The section 9 has a relatively small axial bore 11 for the passage of air, the bore 11 terminating short of the bore at the lower end of the section which receives the pin 8. Adjacent the lower end of the bore 11 the section is bored radially to the bore 11 and tapped to receive the fitting 12 of a branch tube 13 which conducts the air from the passage 11 to the stem of the air bag in the lowermost mould. The section 9 has its upper end 14 turned to a smaller diameter, the reduced end portion terminating at its lower end in a shoulder 15. At its upper end the reduced portion 14 has a socket 16 coaxial with the bore 11 which co-operates with a projection on the next higher section as will be hereinafter described.

The sections 17 of the tree above the lowermost section are identical in construction and interchangeable, each section having an axial bore 18 adapted to register with the bore 11 in the lowermost section. Each section 17 has a counterbore 19 at one end adapted to receive the reduced end portion 14 of the lowermost section. At the bottom of the counterbore 19 there is an axially disposed projection 20 which when the section is placed upon the section 9 projects into the socket 16. The lower portion of the socket 16 is provided with a conical seat surrounding the bore 11 and tapering inwardly. The lower end 22 of the projection 20 is spherical in form and engages with the conical seat 21. By reason of the difference in curvature of the seating portions 21 and 22 of the two sections, there is a circular line contact between the end 22 and the conical seat 21. The counterbore 19 has a depth slightly less than the length of the projection 14 so that the lower end of the section 17 is always out of contact with the shoulder 15. The line contact between the engaging portions immediately surrounding the axial bore provides an effective air seal when endwise pressure is exerted upon the sections by means which will hereinafter be described. The upper end portion 23 of each of the sections 17 is identical with the reduced portion 14 of the lowermost section so that successive sections of the tree engage each other in exactly the same manner as described above.

Mounted centrally upon the upper side of the cover 3 there is a vertically disposed air cylinder 24 which communicates at its upper end with an air inlet conduit 25 which extends to a suitable source of air pressure. The cylinder 24 is provided with a piston 26 which is provided with a piston rod 27, which extends through the piston and is in the form of a tube open from end to end to provide a passage for air from the interior of the cylinder above the piston. The piston rod 27 extends down into the interior of the vulcanizer casing through a suitable gland 28 in the cover and carries at its lower end a coupling member 29 which is of larger diameter than the sections 17 of the tree and has a slip connection with the uppermost section of the tree. The coupling member 29 is formed to provide a central socket to receive the reduced end of the uppermost section, has an axial bore 30 registering with the lower end of the tubular piston rod 27 and with the axial bore 18 of the uppermost tree section, the sealing joint between the coupling 29 and the uppermost section of the tree being exactly the same as the sealing joint between sections of the tree. To insure proper engagement between the coupling member 29 and the uppermost section of the tree, the lower end of the section 29 is beveled inwardly toward the central socket so that when the coupling member is mounted upon the upper end of the tree, the coupling will be guided into sealing engagement with the uppermost section.

After the moulds and the air tree have been assembled within the vulcanizer casing, the cover will be put in place and as the cover is lowered into place, the uppermost section of the tree will be automatically brought into proper engagement with the coupling member 29. When air is admitted under pressure to the upper portion of the cylinder 24, air will pass through the hollow piston rod 27 into the air tree and at the same time pressure will be exerted upon the upper surface of the piston 26 and through the piston rod 27 and sections 17 of the tree to the bottom 2 of the vulcanizing press. Thus as long as air under pressure is maintained within the cylinder 24, there will be a constant pressure exerted upon the tree endwise thereof serving to hold the joints thereof in tight sealing engagement.

In admitting air as above described, air under relatively low pressure is first admitted to the interior of the cylinder 24 which will serve to depress the piston 26 and admit air to the interior of the air bags. In speaking of air under low pressure we mean air at a pressure in the neighborhood of 125 lbs. However, air under such low pressure is not suitable for use during the vulcanizing operation but high pressure air is required at or about 225 lbs., and therefore for the initial admission of low pressure air which accomplishes the purposes above stated, high pressure air is admitted to the cylinder 24 and the high pressure air connection maintains during the vulcanizing operation.

The reason for doing this is that it is cheaper to compress air to 125 lbs. than it is to compress air to 225 lbs. The lower pressure air serves to do the initial work of depressing the piston 26 and filling the air bags and the high pressure air when admitted to the cylinder 24 merely builds up the pressure within the air bags to the required extent and the amount of air actually used at the higher pressure is very much reduced from what it would be if high pressure air were initially admitted to the cylinder 24.

As shown in Fig. 2 of the drawing, each of the branch tubes 13 has a coil 32 and since the tubes are constructed of light flexible tubing such as copper tubing, the tubes may be extended or retracted to properly engage moulds of different diameters such as employed for different sized tires. The branch tubes 13 are all identical in construction and interchangeable. A description of one will therefore suffice for all. At the outer end of the tube 13 there is secured a coupling section 33 which has an axial bore 34 through the passage of air and a spherical projection at its end corresponding to the projection 22 on the section 17. This spherical end portion 35 engages a conical seat 36 in the end of a coupling section 37 attached to the air bag stem 7, the seating portions 35 and 36 having a circular line contact as in the joint between the sections of the air tree above described. The coupling section 33 has a flange 38 adjacent its outer end and a collar 39 slidable thereon inwardly of the flange 38. Rigidly attached to the collar 39 is a sleeve 40 which fits slidably upon the flange 38 of the coupling section. Interposed between the flange 38 and slidable collar 39 is a compression coil spring 41 which serves to resist movement of the sleeve 40 outwardly. At its outer end the sleeve 40 is partially closed and is provided with an elongated opening 42 of a size to receive oppositely projecting lugs 43 on the inner end of the coupling section 37 on the air bag stem. The sleeve 40 is rotatable upon the coupling section 33 so that the opening 42 can be brought to a position to receive the end of the coupling section 37.

The sleeve 40 can then be forced outwardly in opposition to the spring 41 and then rotated to bring the lugs 43 behind retaining ledges 44 at the end of the sleeve on opposite sides of the opening 42. When the branch tube is thus coupled to the air bag stem the spring 41 is under tension and exerts outward pressure upon the coupling section 33 and inward pressure upon the coupling section 37 so that the sealing portions 35 and 36 are maintained under pressure.

Each section of the tree will consist of a body section 16 with a branch tube 13 secured thereto. These sections can be slipped one over the other as the tire moulds are piled in the vulcanizer casing. The connection between the branch tubes 13 and the air bag stems can be very quickly made and as soon as the uppermost mould has been placed in the vulcanizer the cover can be lowered into place and the vulcanizer is ready for operation. It will thus be seen that we have provided an air tree construction which permits the use of air bags within the tire casings without slowing down the operation of the vulcanizing plant.

The fluid conducting tree, in distributing the fluid to the plurality or series of sections, constitutes a manifold for the fluid under pressure.

While one embodiment of the invention has been illustrated and described in such detail as to enable any one skilled in the art to practice the invention, it is to be understood that the invention is not limited to any of the details disclosed, other than as necessitated by the development of the prior art, but instead, the invention embraces such embodiments of the broad idea as fall within the scope of the appended claims, it being obvious that various modifications, substitutions and other changes may be made without departing from the spirit of the invention.

Having described our invention, we claim:

1. In a vulcanizer, the combination with a vulcanizing tank adapted to receive a pile of annular tire molds of a sectional fluid conducting tree adapted to be built up within the annular moulds of a pile, said tank having a detachably fastened cover whereby access may be had to the interior of the tank, of a sectional fluid conducting tree adapted to be built up within a pile of moulds, said tree composed of tubular sections having telescopic slip joints, each section having a branch tube adapted to be detachably connected to a mould to supply fluid thereto, a cylinder carried by the cover, a piston in the cylinder, a piston rod extending through the lower end of the cylinder into the tank, said piston and piston rod having an axial passageway therethrough, the lower end of the piston rod being detachably connected to the uppermost section of the tree, and means for admitting fluid under pressure to the cylinder above the piston to supply fluid to the tree and to exert endwise pressure thereon.

2. In a device of the character described, a pair of tubular sections in sealing engagement end to end, one of said sections having an end portion of reduced diameter, said reduced portion terminating in a shoulder, the other of said sections having a counterbore in which the reduced end of the first section fits, the depth of the counterbore being less than the length of the reduced end fitting therein, the reduced portion of the first member having a recessed seat conical in form, the second member having a projection with a spherical end at the bottom of the counterbore adapted to engage the conical seat.

3. In a device of the character described, a section of a fluid conducting tree comprising a cylindrical body having a relatively small axial bore, said section being of reduced diameter at one end, and having a counterbore at the opposite end of a diameter corresponding to that of the reduced end, seats formed at the end of the reduced portion and at the bottom of the counterbore, one of said seats being recessed and conical in form and the other being convex and adapted to engage the conical seat of an adjacent similarly formed section.

4. An apparatus of the class described for applying pressure to the air bags in a vulcanizing mechanism, a manifold comprising a plurality of sections, means for delivering air pressure to the manifold, and means whereby a portion of said pressure may be utilized for holding the sections of said manifold together.

5. Apparatus comprising a manifold composed of a series of sections, and fluid pressure means for holding the sections of said manifold together.

6. In a vulcanizing press, a sectional manifold, and fluid pressure means for holding the sections of said manifold together.

7. A sectional manifold for use in a vulcanizing press comprising a series of sections adapted to rest on one member of said press, and fluid pressure means associated with another member of said press for forcing said sections into fluid tight relation.

8. In a vulcanizer, a vulcanizing tank, a cover, a sectional manifold in said tank, and fluid pressure means associated with said cover for holding the sections of said manifold together.

9. In a vulcanizer, a vulcanizing tank, a sectional manifold in said tank, an expansible chamber associated with said vulcanizer, means for supplying pressure to said chamber, and means for transmitting the force of said pressure from said chamber to said manifold to hold the sections thereof together.

10. In a vulcanizer, the combination with a vulcanizing tank adapted to receive a pile of annular tire moulds, of a sectional fluid conducting tree adapted to be built up within the annular moulds of a pile, and fluid pressure means for holding the sections of said tree together.

11. Apparatus comprising a tank, a cover for said tank, a sectional manifold in said tank, a cylinder carried by said cover, a piston in said cylinder, means for transmitting force from said piston to said manifold, and means for admitting fluid under pressure to the cylinder.

12. Apparatus comprising a vulcanizing press including a tank, a sectional manifold in said tank, a pressure chamber, a member responsive to pressure in said chamber, means for connecting said member to an end section of said manifold, and means for supplying fluid under pressure to said chamber, whereby said member and said end section transmit the force of said pressure and cause the same to hold the sections of said manifold together.

13. Apparatus comprising a sectional fluid conducting tree, means for delivering fluid under pressure to said tree, and means whereby a portion of said fluid may be utilized for holding the sections of said tree together.

14. In a vulcanizing press, a sectional fluid conducting tree, fluid pressure means for holding the sections of said tree together, means for delivering fluid under pressure to said means, and means for delivering part of said fluid to said tree.

15. In a vulcanizing press, a fluid conducting tree comprising fluid pressure means for holding the sections of said tree in fluid-tight alignment, and means for supplying said tree with fluid from said means.

In testimony whereof, we hereunto affix our signatures.

WALTER E. HUMPHREY.
THORNTON G. GRAHAM.

CERTIFICATE OF CORRECTION.

Patent No. 1,768,406.                                    Granted June 24, 1930, to

WALTER E. HUMPHREY ET AL.

It is hereby certified that the assignee in the above numbered patent was erroneously described and specified as "The Mason Tire & Rubber Co., of Kent, Ohio, a corporation of Delaware", whereas said assignee should have been described and specified as The Mason Tire & Rubber Corporation, of Kent, Ohio, a corporation of Delaware, as shown by the records of assignments in this office; and that the said Letters Patents should be read with this correction therein that the same may conform to the record of the case in the Patent Office.

Signed and sealed this 2nd day of September, A. D. 1930.

(Seal)                                                                M. J. Moore,
                                                                             Acting Commissioner of Patents.